(12) United States Patent
Fan

(10) Patent No.: US 9,898,055 B1
(45) Date of Patent: Feb. 20, 2018

(54) SECURING MECHANISM FOR DATA STORAGE DEVICE

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Chih-Hsiang Fan, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/382,706

(22) Filed: Dec. 18, 2016

(51) Int. Cl.
*G06F 1/18* (2006.01)

(52) U.S. Cl.
CPC ................. *G06F 1/187* (2013.01)

(58) Field of Classification Search
CPC .......................................... G06F 1/187
USPC .................................... 361/679.33
See application file for complete search history.

(56) References Cited

U.S. PATENT DOCUMENTS

| 5,943,208 A * | 8/1999 | Kato ............. G06F 1/184 248/222.11 |
| 7,054,152 B2 * | 5/2006 | Francke ........ G06F 1/1616 361/679.33 |
| 2005/0135057 A1 * | 6/2005 | Mihara ......... G06F 1/1616 361/679.33 |
| 2014/0177144 A1 * | 6/2014 | Wu ............. G06F 1/1613 361/679.01 |

* cited by examiner

*Primary Examiner* — Adrian S Wilson
(74) *Attorney, Agent, or Firm* — ScienBiziP, P.C.

(57) ABSTRACT

A data storage device securing mechanism includes a rack and a securing module. The rack includes a shell and two side plates connected to the ends of the shell. The securing module includes a slidable bracket on the rack and a magnetic latching member. The bracket includes two magnets of opposing poles against two magnetic blocks, and the latching member is rotatably installed on the side plate. When the bracket is slid in the rack, the two magnetic blocks are displaced adjacent to the latching member, to attract or to repel the latching member. The latching member is thereby rotated to approach or to move away from the side plate.

20 Claims, 6 Drawing Sheets

SECURING MECHANISM FOR DATA STORAGE DEVICE

FIELD

The subject matter herein generally relates to an attachment mechanism for a data storage device.

BACKGROUND

When installing a data storage device, for example, a hard drive, to an electronic device, the data storage device is generally secured to a data storage device securing mechanism. Then the data storage device securing mechanism is installed into the electronic device together with the hard drive.

BRIEF DESCRIPTION OF THE DRAWINGS

Implementations of the present technology will now be described, by way of example only, with reference to the attached figures.

DETAILED DESCRIPTION

Figure 1:
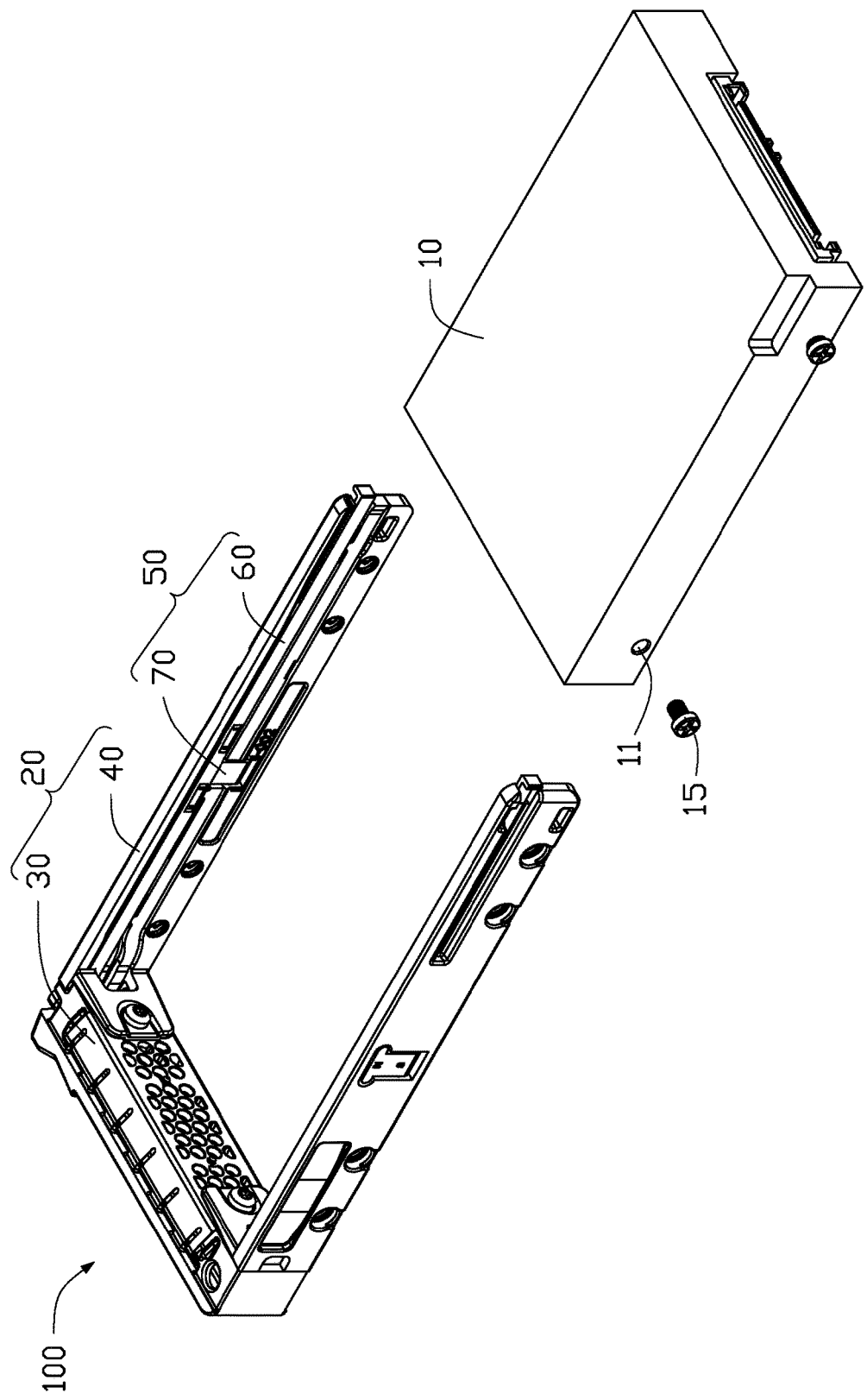
FIG. 1 is an isometric, exploded view of an exemplary embodiment of a securing mechanism for a data storage device and a data storage device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "outside" refers to a region that is beyond the outermost confines of a physical object. The term "inside" indicates that at least a portion of an object is contained within a boundary formed by another object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates one exemplary embodiment of a data storage device securing mechanism 100 for installing a data storage device 10 to an electronic device (not shown). The data storage device securing mechanism 100 includes a rack 20 configured to receive the data storage device 10 and a securing module 50 slidably installed on the rack 20.

Each side of the data storage device 10 defines a plurality of securing holes 11. The rack 20 fits on both sides of the data storage device 10 and is inserted into the securing holes 11.

Figure 2:
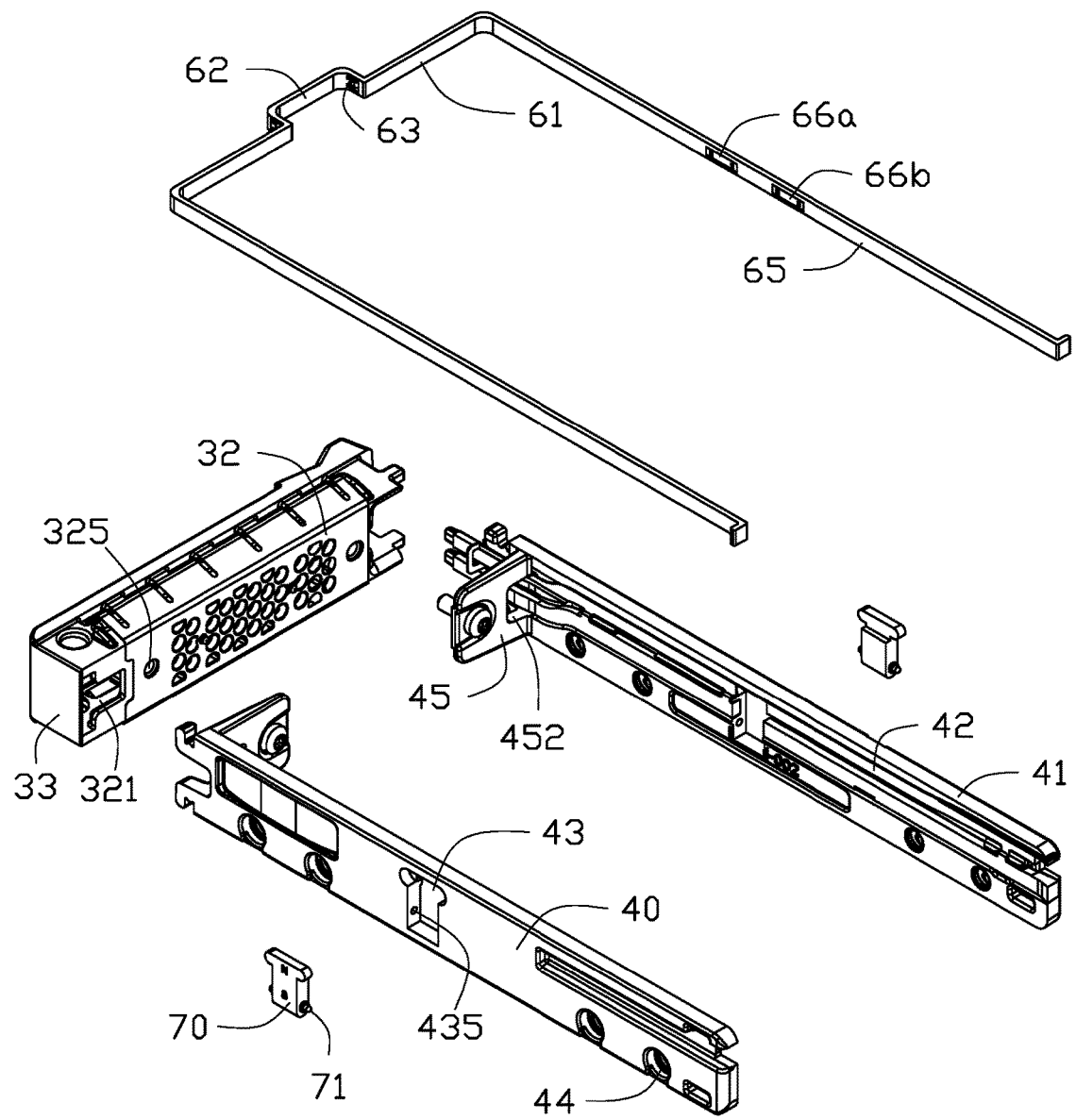
FIG. 2 is an isometric, exploded view of an exemplary embodiment of the data storage device securing mechanism of FIG. 1.
Figure 3:
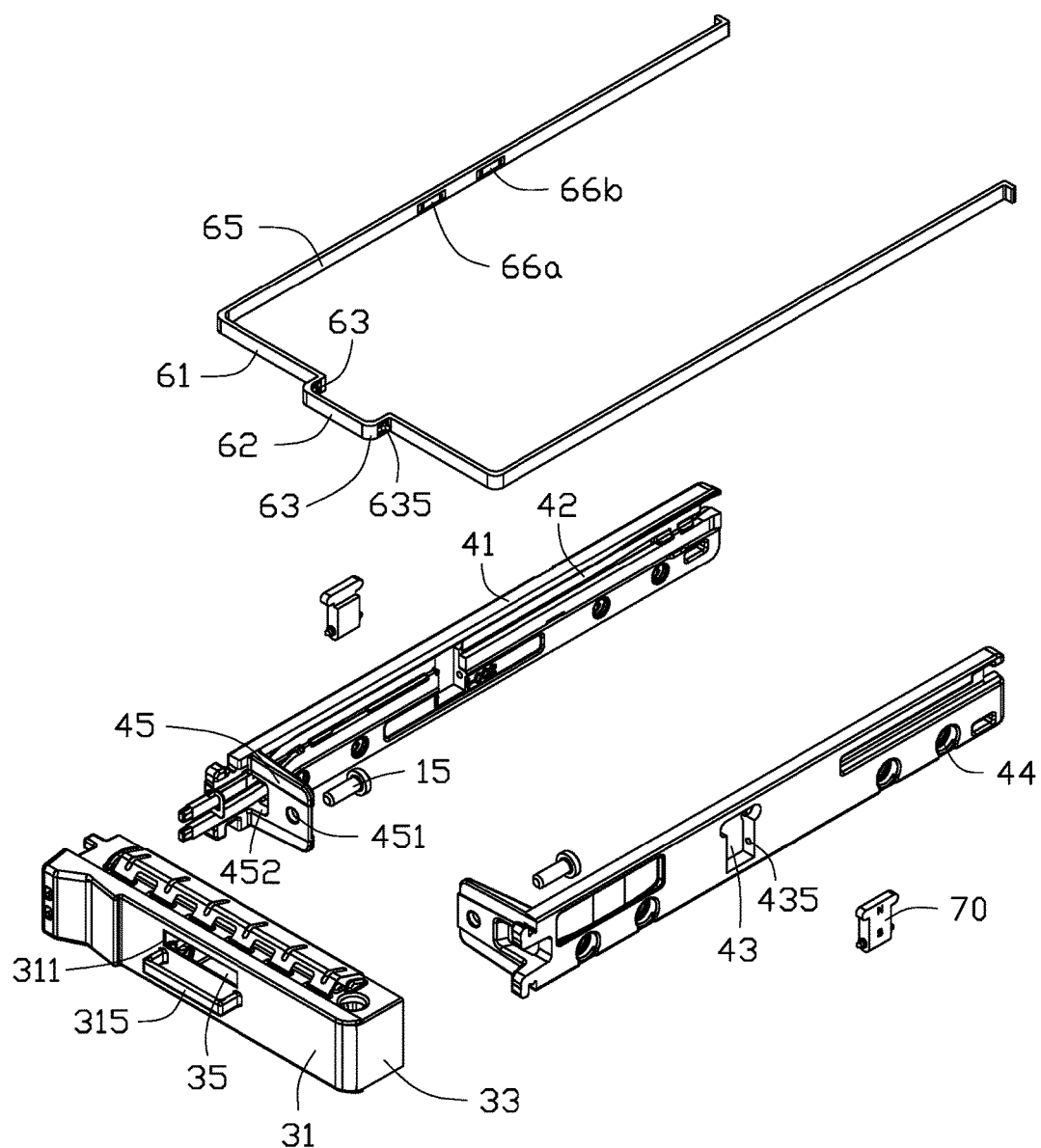
FIG. 3 is another isometric, exploded view of an exemplary embodiment of the data storage device securing mechanism of FIG. 1.

FIGS. 2 and 3 illustrate an exemplary embodiment of a rack 20, the rack 20 includes a shell 30 and two side plates 40 perpendicularly connected with the two sides of the shell 30. The shell 30 includes a front wall 31 and a rear wall 32. Each side of the front wall 31 is connected to but dismountable from the rear wall 32 through the sidewall 33. The shell 30 defines a receiving space 35 between the front wall 31 and the rear wall 32. The middle of the front wall 31 defines an opening 311 adjacent to the opening 31. The front wall 31 is provided with a handle 315 under the opening 311 in a direction away from the rear wall 32. The handle 315 is configured to push the data storage device securing mechanism 100. The edge of each side of the rear wall 32 defines a notch 321, and the corresponding part of the securing module 50 can pass through the notch 321. The rear wall 32 further defines a mounting hole 325 close to each notch 321. The mounting hole 325 is configured to secure the side plate 40.

Each side plate 40 includes a board 41 and a mounting plate 45 extending from the one end of the board 41. Each board 41 defines a slide rail 42, and the slide rail 42 is coplanar to the board 41. The middle of the board 41 defines a displacement port 43 adjacent to the slide rail 42. On the board 41, a pivot hole 435 is defined on both sides of the displacement port 43. The board 41 further defines a plurality of through holes 44 under the slide rail 42. A plurality of securing members 15 is configured to pass through the through holes 44 to be secured in the data storage device 10.

Each mounting plate 45 also defines a mounting hole 451, the securing member 15 can pass through the mounting hole 451 and the mounting hole 352 to secure the mounting plate 45 on the shell 30. The mounting plate 45 defines a perforation 452 corresponding to the notch 321 at the point of contact with the board 41, the corresponding part of the securing module 50 can pass through the perforation 452.

The securing module 50 includes a bracket 60 and two latching members 70 rotatably installed on the rack 20. The bracket 60 includes a mandrel 61 and two sliding pole 65 perpendicularly connected with two ends of the mandrel 61. The mandrel 61 is received in the receiving space 35. The mandrel 61 includes a projecting portion 62, and a connecting rod 63 is formed at each end of the mandrel 61. Each connecting pole 63 defines a receiving hole 631, and a grab 635 is elastically connected to the receiving hole 631. The projecting portion 62 can pass through the opening 311 to extend out of the receiving space 35. The grab is configured to be elastically deformed to latch at both ends of the opening 311.

The sliding pole 65 is inserted into the receiving space 35 through the perforation 452 and the notch 321 to connect with the mandrel 61. Each sliding pole 65 is slidably installed in the corresponding slide rail 42, and the tail end of the sliding pole 65 is configured to be slid out of the slide rail 42 to extend out of the side plate 40. Each sliding pole 65 is provided with a pair of magnetic blocks 66a, 66b which are opposite to each other. The magnetic pole of the magnetic block 66a is opposite to the magnetic pole of the magnetic block 66b.

Both ends of the bottom of the latching member 70 are provided with a pivot shaft 71 configured to be inserted into the pivot hole 435 on both sides of the displacement port 43. The latching member 70 is thus rotatably installed in the displacement port 43. The latching member 70 is made of a magnetic material. The magnetic pole of the end positioned away from the pivot shaft 71 of the latching member 70 is opposite to the magnetic pole of the magnet block 66a and is the same as the magnetic pole of the magnet block 66b.

Figure 4:
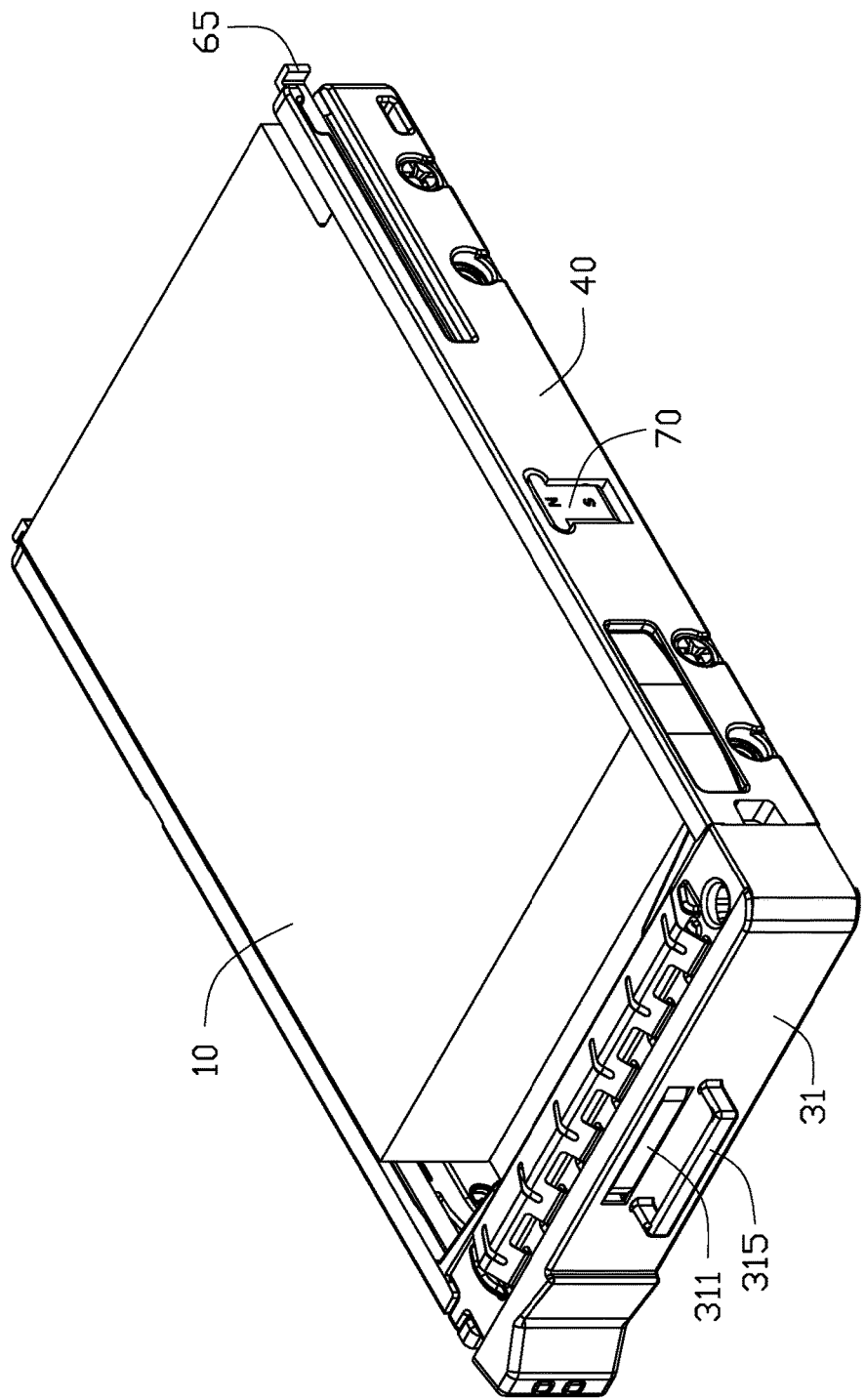
FIG. 4 is an assembled, isometric view of the data storage device securing mechanism and the data storage device of FIG. 1, wherein the data storage device securing mechanism and the data storage device are in an unlocked state.

FIG. 4 illustrates the exemplary data storage device securing mechanism when assembled. Referring to FIG. 3, the two mounting plates 45 are located on the rear wall 32 of the shell 30. The mounting holes 451 of the mounting plate 45 are aligned with the mounting holes 325 of the rear wall 32, and the securing members 15 pass through the mounting holes 325 and are inserted into the mounting holes 451 to secure the two mounting plates 45 on the rear wall 32. The securing module 50 is placed in the rack 20. The sliding poles 65 pass through the notch 321 and the perforation 452 to be slidably installed on the slide rail 42 of the board 41.

One end away positioned from the mandrel 61 of the sliding pole 65 is slid out of the slide rail 42 to extend out the side plate 40. The front wall 31 is secured on the rear wall 32 after the mandrel 61 is received in the receiving space 35. Then, the pivot shaft 71 of the latching member 70 is inserted into the corresponding pivot hole 435 to rotatably install the latching member 70 on the side plates 40. The data storage device securing mechanism 100 is thus assembled. The magnetic block 66a is adjacent to the latching member 70 to attract the latching member 70, and the latching member 70 is rotated to abut against the sliding pole 65. The latching member 70 is rotated to be substantially coplanar to the outer surface of the side plate 40.

Figure 5:
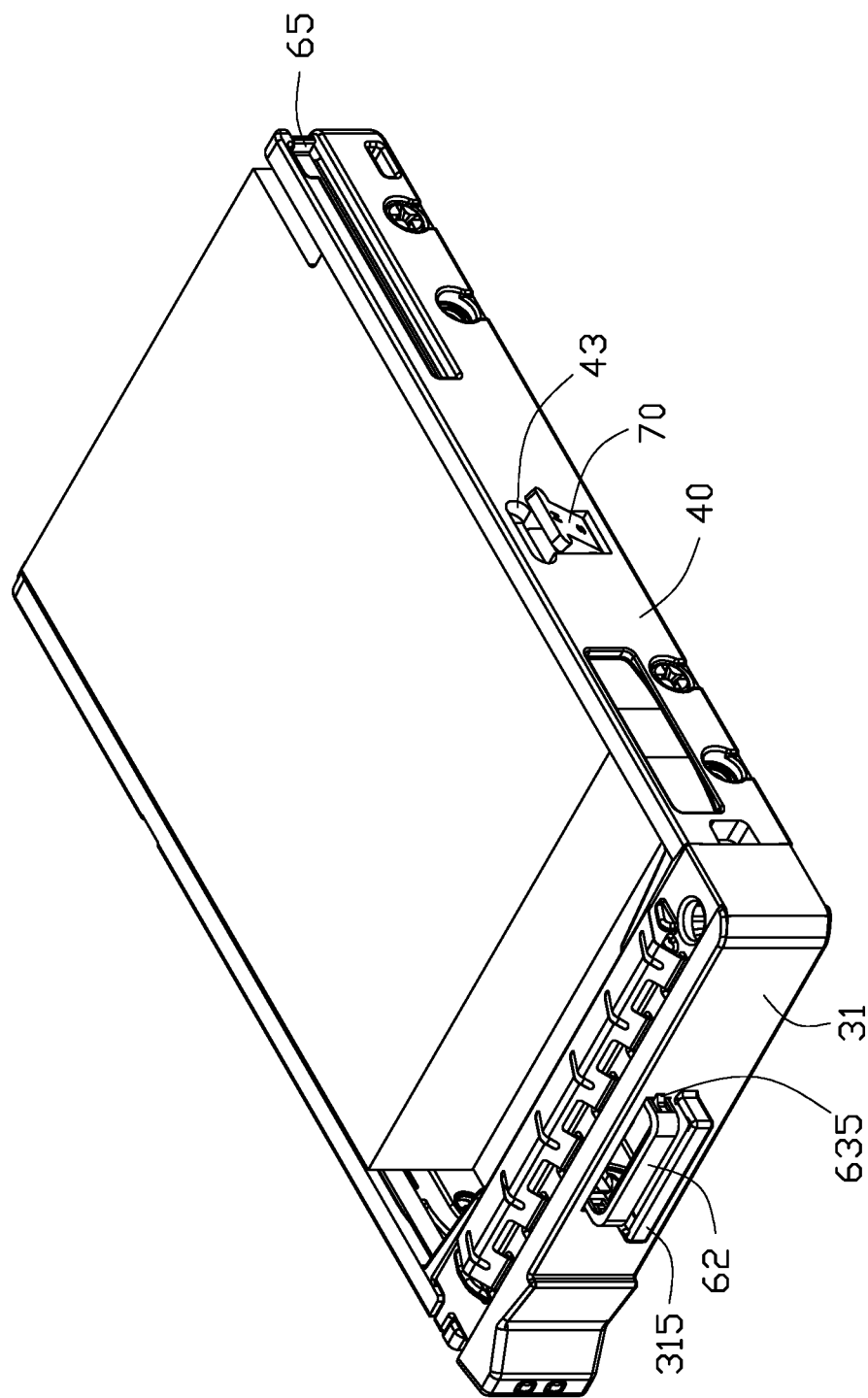
FIG. 5 is an assembled, isometric view of the data storage device securing mechanism and the data storage device of FIG. 1, wherein the data storage device securing mechanism and the data storage device are in a locked state.
Figure 6:
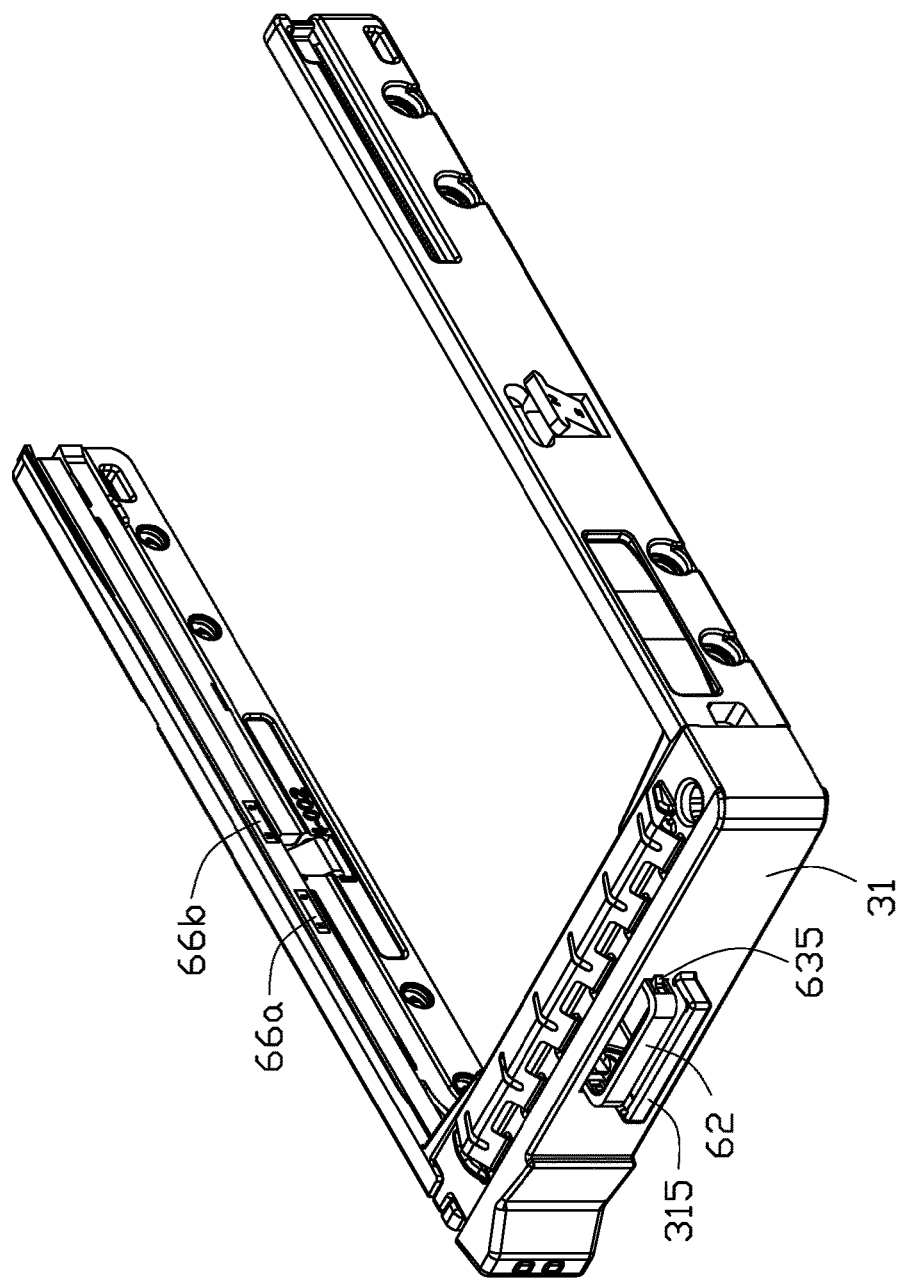
FIG. 6 is an assembled, isometric view of the data storage device securing mechanism of FIG. 5.

FIGS. 5 and 6 illustrate the data storage device 10 ready for installation into the electronic device. The data storage device 10 is placed between the two side plates 40, the securing holes 11 are aligned with through holes 44 of the side plate 40, and the securing members 15 pass through the through holes 44 and are inserted into the securing holes 11, to secure the data storage device 10 in the data storage device securing mechanism 100. Then, the data storage device 10 and the data storage device securing mechanism 100 are inserted into the electronic device. The tail end of the sliding pole 65 abuts the electronic device and is pressed by the electronic device to slide in the direction of the shell 30 until the tail end is flush with the tail end of the side plate 40.

Then, the mandrel 61 is slid towards the front wall 31 underneath the driven of sliding pole 65 and passes through the opening 311 to extend out the receiving space 35. The projecting portion 62 is pulled and the grab 635 is elastically deformed to pass through the opening 311, elastic restoration causes latching on both ends of the opening 311 to prevent the bracket 60 from being retracted. The magnet block 66a is separated from the latching member 70 and the magnet block 66b is adjacent to the latching member 70, to repel the latching member 70. The latching member 70 is rotated away from the sliding pole 65 and extends out the side plate 40 to be inserted into the corresponding latch hole of the electronic device. The data storage device 10 and the data storage device securing mechanism 100 are thereby mounted into the electronic device.

When the data storage device 10 needs to be taken out, the grabs 635 of both ends of the projecting portion 62 are pressed to be received into the opening 311. The projecting portion 62 is pushed toward the receiving space 35 to be received in the receiving space 35. The two sliding poles 65 are slid in the direction away from the shell 30 along the slid rail 42 until the tail end of the sliding pole 65 is flush with the tail end of the side plate 40. Then, the magnet block 66b is separated from the latching member 70, but the magnet block 66a is adjacent to the latching member 70, and attracts the latching member 70. The latching member 70 is rotated by being attracted to the magnetic block 66a, so as to separate from the corresponding latch hole of the electronic device. The latching member 70 abuts against the sliding pole 65 and is substantially coplanar to the outer surface of the side plate 40. Then, the data storage device 10 and the data storage device securing mechanism 100 can be taken out by pulling the handle 315 of the rack 20.

The exemplary embodiments shown and described above are only examples. Many details are often found in the art such as the other features of a data storage device securing mechanism. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A data storage device securing mechanism, comprising:
   a rack, the rack comprising a shell and two side plates respectively connected to both ends of the shell; and
   a securing module comprising:
      a bracket slidably installed on the rack, the bracket comprising two magnetic blocks, the magnetic poles of two magnets are in opposite directions; and
      a latching member having a magnetic property rotatably installed on each side plate;
   wherein when the bracket is slid in the rack, the two magnetic blocks are positioned adjacent to the latching member to either attract or repel the latching member, and the latching member is rotated to approach or move away from the side plate.

2. The data storage device securing mechanism of claim 1, wherein the bracket comprises two sliding poles slidably installed on the side plate, and the two magnet blocks are located on the sliding pole.

3. The data storage device securing mechanism of claim 2, wherein each side plate is provided with a slide rail, and the sliding pole is received in the slide rail and can be slid along the slide rail.

4. The data storage device securing mechanism of claim 1, wherein each side plate defines a displacement port, and the latching member is rotatably installed in the displacement port.

5. The data storage device securing mechanism of claim 4, wherein the side plate defines a pivot hole on both sides of the displacement port, each side of the latching member is provided with a pivot shaft, and the pivot shaft is configured to be inserted into the pivot hole to rotatably install the latching member on the side plate.

6. The data storage device securing mechanism of claim 1, wherein a receiving space is defined in the shell, and the bracket comprises a mandrel, the mandrel is configured to be received in the receiving space.

7. The data storage device securing mechanism of claim 6, wherein the mandrel comprises a projecting portion, and a front wall of the shell defines an opening adjacent to the receiving space, the bracket is slid to let the projecting portion pass through the opening to extend out the receiving space.

8. The data storage device securing mechanism of claim 6, wherein a notch is defined in each of both ends of a rear wall of the shell, and the bracket comprises two sliding poles, the sliding poles are configured to pass through the notch to connect with the both ends of the mandrel.

9. The data storage device securing mechanism of claim 7, wherein each end of the projecting portion is provided with a grab, and the grab is elastically deformed to pass through the opening and elastically deform to latch on both ends of the opening to prevent the bracket from being retracted.

10. The data storage device securing mechanism of claim 1, wherein the shell further comprising two ends position apart from each other, wherein each of the ends of a rear wall of the shell defines a mounting hole, and the side plate is provided with a mounting plate, a plurality of securing members pass through the mounting plate and are inserted into the mounting hole to secure the side plate on the shell.

11. An electronic device, comprising:
a data storage device; and
a data storage device securing mechanism configure to receive the data storage device, comprising:
 a rack, the rack comprising a shell and two side plates respectively connected to both ends of the shell; and
 a securing module comprising:
  a bracket slidably installed on the rack, the bracket comprising two magnetic blocks, the magnetic poles of two magnets are in opposite directions; and
  a latching member having a magnetic property rotatably installed on the side plate;
wherein when the bracket being slid in the rack, two magnetic blocks are positioned adjacent to the latching member to either attract or repel the latching member, and the latching member is rotated to approach or move away from the side plate.

12. The electronic device of claim 11, wherein the bracket comprises two sliding poles slidably installed on the side plate, and the two magnet blocks are located on the sliding pole.

13. The electronic device of claim 12, wherein each side plate is provided with a slide rail, and the sliding pole is received in the slide rail and can be slid along the slide rail.

14. The electronic device of claim 11, wherein each side plate defines a displacement port, and the latching member is rotatably installed in the displacement port.

15. The electronic device of claim 14, wherein the side plate defines a pivot hole on both sides of the displacement port, each side of the latching member is provided with a pivot shaft, and the pivot shaft is configured to be inserted into the pivot hole to rotatably install the latching member on the side plate.

16. The electronic device of claim 11, wherein a receiving space is defined in the shell, and the bracket comprises a mandrel, the mandrel is configured to be received in the receiving space.

17. The electronic device of claim 16, wherein the mandrel comprises a projecting portion, and a front wall of the shell defines an opening adjacent to the receiving space, the bracket is slid to let the projecting portion pass through the opening to extend out the receiving space.

18. The electronic device of claim 16, wherein a notch is defined in each of both ends of a rear wall of the shell, and the bracket comprises two sliding poles, the sliding poles are configured to pass through the notch to connect with the both ends of the mandrel.

19. The electronic device of claim 17, wherein each end of the projecting portion is provided with a grab, and the grab is elastically deformed to pass through the opening and elastically deform to latch on both ends of the opening to prevent the bracket from being retracted.

20. The electronic device of claim 11, wherein the shell further comprises two ends position apart from each other, wherein each of the ends of a rear wall of the shell defines a mounting hole, and the side plate is provided with a mounting plate, a plurality of securing members pass through the mounting plate and are inserted into the mounting hole to secure the side plate on the shell.

* * * * *